Dec. 7, 1926.
C. B. BAILEY
GASKET
Filed June 15, 1925
1,609,283
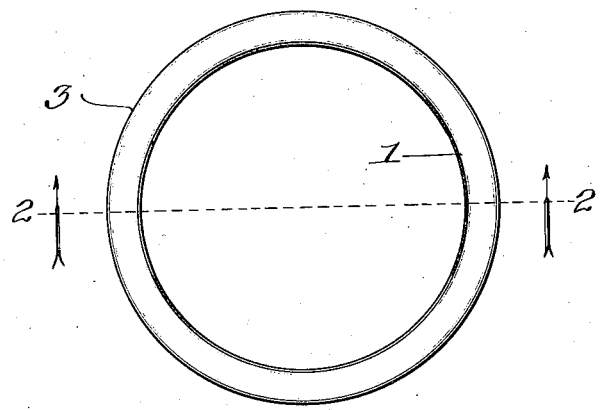
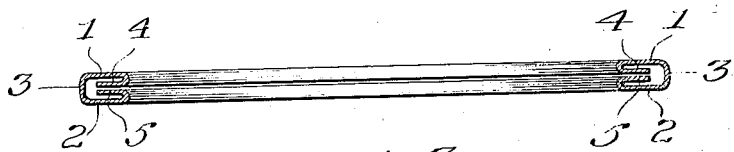
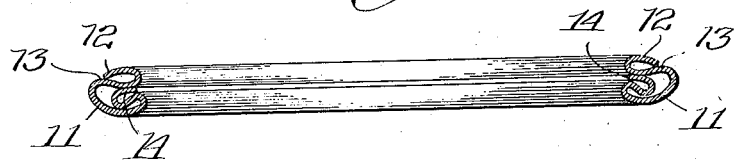
Inventor:
Claude B. Bailey,
By Eugene Ewan
Atty.

Patented Dec. 7, 1926.

1,609,283

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 15, 1925. Serial No. 37,040.

The gasket contemplated by this invention is made entirely of sheet metal and has its body or pressure receiving portion in folded form to provide the cushion required, without the use of asbestos or other packing material, thereby simplifying the structure and reducing the manufacturing cost of the same.

The invention consists further in the matters hereinafter described and claimed.

In the accompanying drawings—

Fig. 1 is an elevational view of the gasket made in accordance with my invention;

Fig. 2 is an enlarged diametrical sectional view taken on line 2—2 of Fig. 1; and Figs. 3 and 4 are similar views showing modified forms of structure.

The gaskets shown in the several figures of the drawings are annular in shape and are composed of a plurality of superimposed folds or layers formed from a single piece of sheet metal, such as copper, brass, aluminum, zinc, or the like, to provide the pressure receiving portions of the gaskets and take the place of the cushions of asbestos or other packing material as heretofore employed in conjunction with sheet metal gaskets of this general character.

In Figs. 1 and 2, the sheet metal stock of the gasket is folded on itself to provide outer layers 1, 2 arranged substantially parallel to each other and to the plane of the gasket. These layers are connected together around the outer edge of the gasket by an integral connecting portion 3. The inner marginal portions of the layers 1 and 2 are folded inwardly so as to extend into the channel or space provided by the layers 1 and 2. These inwardly folded portions are marked 4 and 5 and are substantially parallel to each other and to the layers 1 and 2 on the outside, as shown. The folds or layers 1 and 2 and 4 and 5 constitute the pressure receiving portion of the gasket and provide the cushion required, without the use of asbestos or other packing material as heretofore employed.

By increasing or decreasing the number of folds or layers, sufficient metal may be provided to suit the conditions of the finish of the surfaces between which the gasket is clamped. Fairly rough surfaces, such as presented by some castings, require a greater number of folds than better finished surfaces. The metal making up the folds is under slight tension and the folds are slightly spaced apart. This makes the pressure receiving portion of the gasket yieldable to the clamping pressure when exerted on the gasket, to produce tight joints.

In Fig. 3, I have shown a gasket wherein its pressure receiving portion is composed of three folds or layers instead of four as in Fig. 2. In Fig. 3, the gasket is made entirely from sheet metal and from a single piece of that material. The metal stock is folded to have superimposed folds or layers 6, 7, and 8. The folds 6 and 8 on the outside are connected around the inner edge of the gasket by a folded portion 9 of the metal. The folds 6 and 7 are connected in like manner around the outer edge of the gasket by an integral connecting portion 10, as shown. In both Figs. 2 and 3, the folds or layers extend completely across the pressure receiving portion of the gaskets and are flat so as to seat against the members between which they are clamped.

In Fig. 4, I have shown the pressure receiving portion of the gasket composed of five folds so as to adapt the gasket for use between rougher surfaces, so that the metal of the gasket will fill the interstices or other irregularities in the surfaces between which the gasket is clamped to provide a tight joint. In Fig. 4, the gasket is also made entirely of sheet metal and from a single piece of that material. The metal stock is folded in a somewhat S form with the fold 11 constituting one face of the gasket and the fold 12 the opposite face, said folds being connected by an intermediate fold 13. The fold 12 extends substantially across the entire width of the gasket body and is integrally connected with the fold 13 along the inner edge of the gasket. The marginal portion of the layer 11 is doubled or folded on itself to lie between the folds 11 and 13, as shown, with the innermost part of the fold 14 turned outward to engage the layer 13.

In this gasket, the greater thickness of the sheet metal is immediately around the edge of the gasket opening and, by being so located, the pressure exerted on the gasket when clamping it between two members may be confined to and concentrated on the thicker portion of the gasket and thus provide a tight joint immediately about the gasket opening. Moreover, in folding the gasket in this manner there is sufficient space provided within the folds so that the sheet metal body of the gasket will yield under a clamping pressure to produce a tight joint.

While I have shown the gaskets of my invention annular, it is of course to be understood that the gaskets of my invention may take other forms as may be required to meet the various shapes of joints as encountered in practice. Moreover, I do not wish to be restricted to the particular number of folds or the particular manner of folding the sheet metal stock from which the gasket is made. In having the gaskets made entirely of sheet metal and from single pieces of that material, all the parts of the respective gaskets are integrally connected, thereby providing a simplified and more durable structure and avoiding blowouts when the gaskets are in use.

I claim as my invention:

1. A gasket made entirely from a single piece of sheet metal and folded into substantially S form with the margins of the folded section on the inside and outside respectively of the gasket, one of the marginal portions of the section being doubled on itself to increase the thickness of the gasket section along the same.

2. A gasket made entirely from sheet metal and folded into substantially S form to provide superimposed folds for the gasket body with the margins of the folded section on the inside and outside respectively of the gasket body, the marginal portion of the fold around the inside of the gasket body being doubled inwardly on itself to increase the number of folds around the inner edge of the gasket.

In testimony whereof I affix my signature this 11 day of June, 1925.

CLAUDE B. BAILEY.